(12) United States Patent
Nishita et al.

(10) Patent No.: US 8,572,428 B2
(45) Date of Patent: Oct. 29, 2013

(54) STORAGE APPARATUS AND CONTROL METHOD FOR STORAGE APPARATUS

(75) Inventors: Satoru Nishita, Kahoku (JP); Yukio Nishimura, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 13/279,491

(22) Filed: Oct. 24, 2011

(65) Prior Publication Data

US 2012/0159265 A1    Jun. 21, 2012

(30) Foreign Application Priority Data

Dec. 20, 2010  (JP) ................................. 2010-283108

(51) Int. Cl.
 *G06F 11/00* (2006.01)
(52) U.S. Cl.
 USPC ......................................................... 714/6.1
(58) Field of Classification Search
 USPC ......................................................... 714/6.1
 See application file for complete search history.

(56) References Cited

U.S. PATENT DOCUMENTS

| 7,302,606 | B2 | 11/2007 | Fujimoto et al. | |
|---|---|---|---|---|
| 7,509,527 | B2 | 3/2009 | Kawada et al. | |
| 7,536,576 | B2 | 5/2009 | Shima et al. | |
| 7,769,921 | B2 | 8/2010 | Hirayama | |
| 2010/0077117 | A1* | 3/2010 | Asnaashari | 710/74 |
| 2012/0005539 | A1* | 1/2012 | Paul et al. | 714/43 |
| 2012/0144230 | A1* | 6/2012 | Buckland et al. | 714/4.5 |
| 2012/0159265 | A1* | 6/2012 | Nishita et al. | 714/49 |
| 2012/0166699 | A1* | 6/2012 | Kumar et al. | 710/306 |
| 2012/0185632 | A1* | 7/2012 | Lais et al. | 710/308 |
| 2013/0060987 | A1* | 3/2013 | Bolen et al. | 710/316 |

FOREIGN PATENT DOCUMENTS

| JP | 2000-181887 A | 6/2000 |
|---|---|---|
| JP | 2006-107053 A | 4/2006 |
| JP | 2007-293448 A | 11/2007 |
| JP | 2009-266119 A | 11/2009 |

* cited by examiner

*Primary Examiner* — Bryce Bonzo
(74) *Attorney, Agent, or Firm* — Fujitsu Patent Center

(57) ABSTRACT

A first controller stores externally input data to a memory of the first controller, reads data stored in the memory of the first controller and transmits the data to a second controller through a first controller bridge, detects a failure at the first controller bridge in transmission of the data. The second controller receives the data through a second controller bridge, writes the received data into a memory of the second controller, and determines whether the failure is caused by the first controller if a failure occurs in the memory controller and the second controller bridge. If a failure is detected in the first controller and the second controller and the failure is caused by the first controller, the first controller transmits the data causing the failure during transmission through the first controller bridge and the second controller receives the data through the second controller bridge.

5 Claims, 8 Drawing Sheets

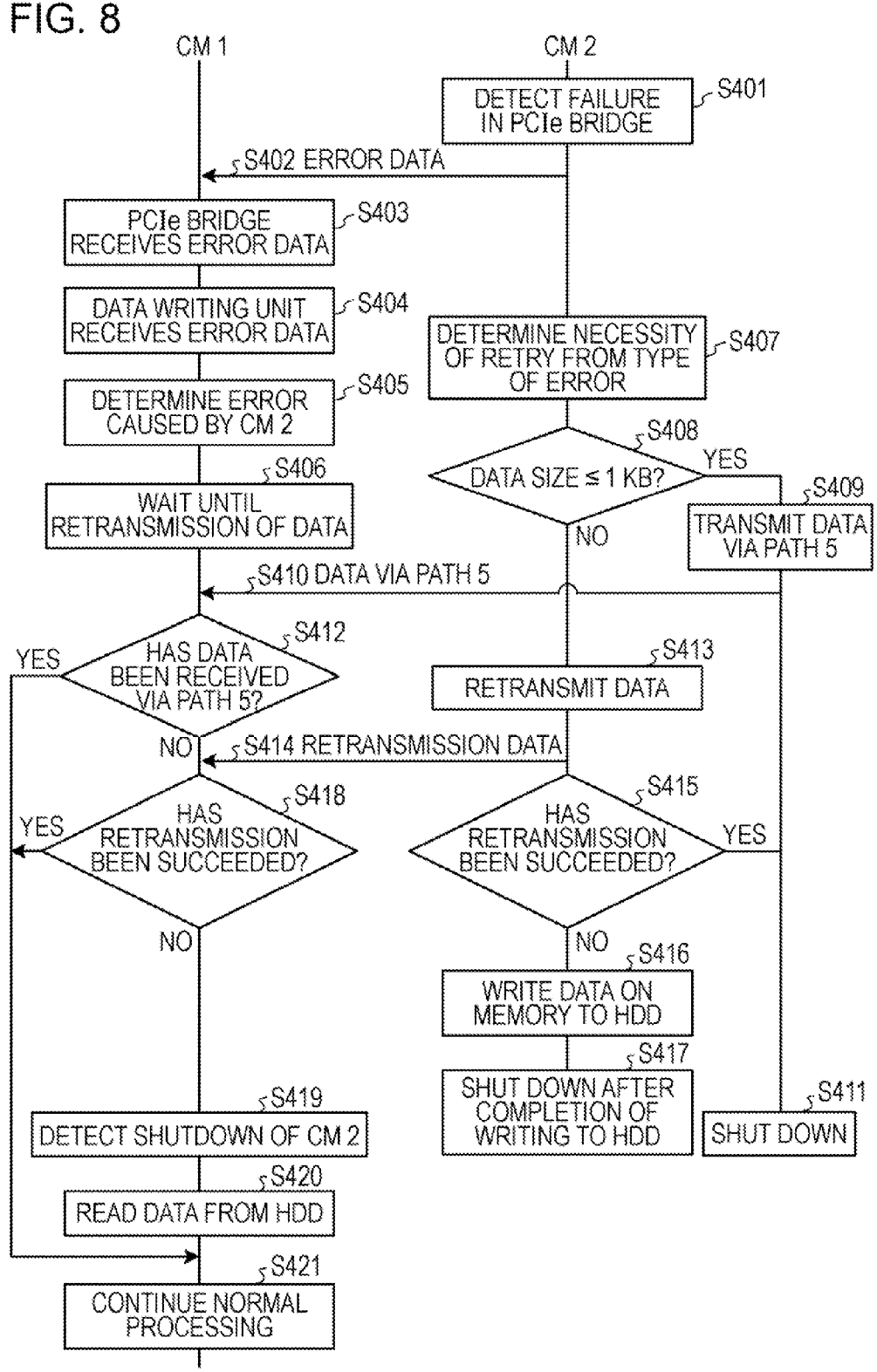

STORAGE APPARATUS AND CONTROL METHOD FOR STORAGE APPARATUS

CROSS-REFERENCE TO RELATED APPLICATION

This application is based upon and claims the benefit of priority of the prior Japanese Patent Application No. 2010-283108, filed on Dec. 20, 2010, the entire contents of which are incorporated herein by reference.

FIELD

The embodiments discussed herein are related to storage apparatuses and control methods for storage apparatuses.

BACKGROUND

A storage apparatus which stores data transmitted from a host has a controller module (hereinafter, called a "CM") for storing received data in a hard disk. The CM has a volatile memory. For faster processing, the received data is written by storing data in a memory of the CM once and then writing the data in the memory to a hard disk.

In recent years, in order to meet the request for improvements in reliability, a plurality of CMs are provided in a storage apparatus, and the CMs are mutually connected to duplex data in memories in the CMs so that processing may be continued even when a CM fails.

In the duplexing, it has been considered that an error occurring in one CM does not influence the inside of the other duplexed CM. Accordingly, a failing CM has been identified on the basis of device error information in the CM, and isolation processing has been performed including shutting down the CM.

However, it has been emerged that some types of errors may influence the inside of the other CM. In this case, it is determined that not only the failing CM but also a CM that is not failing have a failure, and both of the CMs are shut down, which is a problem. The types of error that cause the problem may include a failure in a PCIe (Peripheral Component Interconnect express) bridge, for example.

An operation by a storage when a PCIe bridge fails will be described more specifically below. In this case, a storage apparatus has two CMs of a CM #0 and a CM #1, for example.

It is assumed that an error occurs at a PCIe bridge in the CM #1. The error may be caused by a data parity error, for example. Accordingly, the CM #1 determines from the error information that CM #1 has a failure and shuts down the CM #1.

On the other hand, an error is also detected at a PCIe bridge in the CM #0. The CM #0 determines from the error information that the CM #1 has an error.

Here, the error data having passed through the PCIe bridge of the CM #0 reaches a memory controller and results in a parity error. The CM #0 then detects the error due to the parity error in the memory controller. In this case, the CM #0 determines that the memory controller is failing and shuts down the CM #0.

Before the CM #0 is shut down, the memory controller having received the error data also writes the error data to a memory without stopping the error data. In this case, though the memory is ECC (Error Check and Correct)-protected, the memory controller generates the ECC on the basis of the error data. As a result, the fact that the written data has an error may not be detected.

Against this problem, various arts have been proposed for improved fault tolerance of storages. For example, when an error occurs during data writing from a CM to a disk, an art in the past reconstructs the path from the failing CM to the disk to complete the data writing. Another art in the past has been proposed which determines a failing part when a failure occurs. Another art in the past has been proposed which identifies a part having a failure and restarts it. Another art in the past has been proposed which selects a preferable path for improved access performance. Japanese Laid-open Patent Publication Nos. 2006-107053, 2000-181887, 2009-266119 and 2007-293448 are examples of related art.

SUMMARY

According to an aspect of the invention, a method includes storing, by the first data controller, externally input data to a memory of the first data controller, reading, by the first data controller, data stored in the memory of the first data controller and transmits the data to the second data controller through a PCIe bridge of the first data controller, detecting, by the first data controller, a failure at the PCIe bridge of the first data controller in transmission of the data, receiving, by the second data controller, the data transmitted from the first data controller through a PCIe bridge of the second data controller, writing, by the second data controller, the received data to a memory of the second data controller, determining, by the second data controller, whether the failure is caused by the first data controller or not if a failure occurs in the memory controller and PCIe bridge of the second data controller when the received data is written to the memory, transmitting, by the first data controller, the data causing the failure during transmission through the PCIe bridge of the first data controller if a failure is detected in the first data controller and the second data controller and the failure is caused by the first data controller, and receiving, by the second data controller, the data retransmitted from the PCIe bridge of the first data controller through the PCIe bridge of the second data controller if a failure is detected in the first data controller and the second data controller and the failure is caused by the first data controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a sequence diagram of processing upon occurrence of a parity error during data duplexing in a storage apparatus according to a third embodiment.

DESCRIPTION OF EMBODIMENTS

Hereinafter, embodiments of a storage apparatus and control method for a storage apparatus disclosed in the subject application will be described in detail with reference to drawings. The following embodiments do not limit the storage apparatus and control method for a storage apparatus disclosed in the subject application.

First Embodiment

Figure 1:
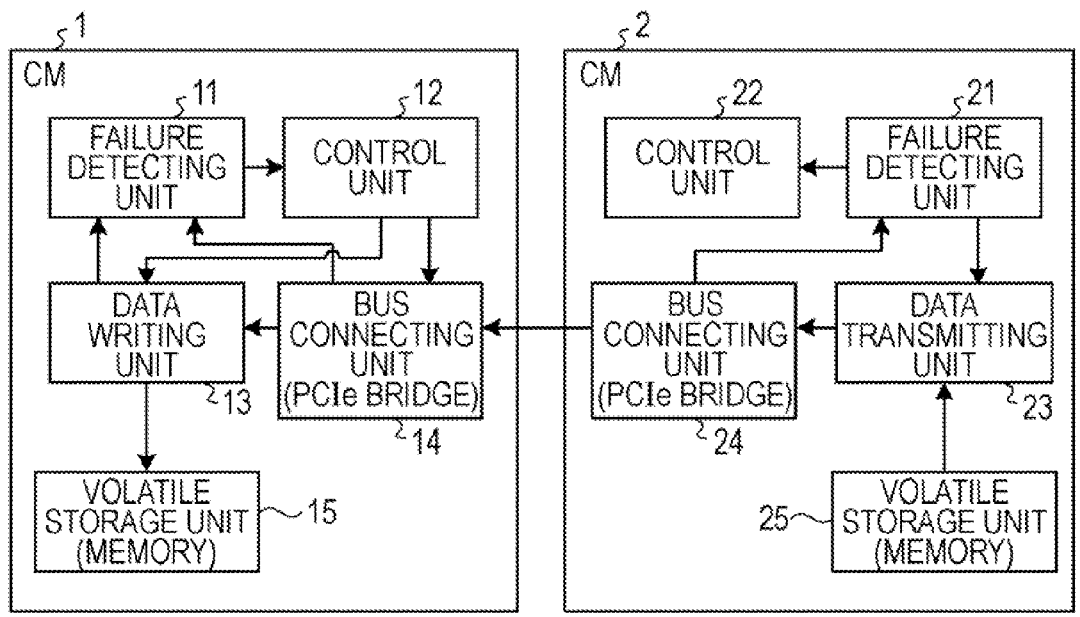
FIG. 1 is a block diagram of a controller module according to a first embodiment.

FIG. 1 is a block diagram of a controller module (CM) arranged in a storage apparatus according to this embodiment. As illustrated in FIG. 1, a CM 1 has a failure detecting unit 11, a control unit 12, a data writing unit 13, a bus connecting unit 14 and a volatile storage unit 15. A CM 2 has a failure detecting unit 21, a control unit 22, a data transmitting unit 23, a bus connecting unit 24 and a volatile storage unit 25. According to this embodiment, the bus connecting unit 14 and bus connecting unit 24 correspond to PCIe bridges and thus will be called a PCIe bridge 14 and a PCIe bridge 24, respectively, hereinafter. According to this embodiment, the volatile storage unit 15 and volatile storage unit 25 also correspond to memories and thus will be called a memory 15 and a memory 25, respectively, hereinafter. The CM 1 corresponds to an example of a "second data controller", and the CM 2 corresponds to an example of a "first data controller". The volatile storage unit 25 corresponds to an example of a "first storage unit", and the volatile storage unit 15 corresponds to an example of a "second storage unit".

The CM 2 is connected to a host computer (hereinafter, simply called a "host") such as a server and receives data and an instruction to write the data from the host. If the CM 2 receives an instruction to write data from the host, the CM 2 temporarily stores data to the memory 25. The CM 2 then writes the data stored in the memory 25 to a hard disk. The entire operation by the storage apparatus will be described later in detail. In this case, the CM 2 and CM 1 copy the data stored in the memory 25 to the memory 15 to duplex the data. An operation by the CM 1 and CM 2 for duplexing data will be described below.

The following description assumes that data transmitted from the host memory 25 has already been stored, for example. The case where a data parity error occurs will be described below, for example. Though a parity error will be described as an example of an occurring error, the error to be detected may be any error that influences the inside of the CM on the data receiver side and is not particularly limited. For example, another example of the error may be an error in the address of the storage destination of data or a transmission path error.

The data transmitting unit 23 reads data from the memory 25. The data transmitting unit 23 transmits the read data to the PCIe bridge 24. If the data transmitting unit 23 receives an instruction to retransmit the data, which will be described below, from the failure detecting unit 21, the data transmitting unit 23 reads the data transmitted to the PCIe bridge 24 last time from the memory 25. The data transmitting unit 23 transmits the read data to the PCIe bridge 24.

The PCIe bridge 24 connects between the bus of the CM 1 and the bus of the CM 2 along with the PCIe bridge 14 and allows data exchange between the CM 1 and the CM 2. The PCIe bridge 24 receives data from the data transmitting unit 23. The PCIe bridge 24 checks the received data, by performing parity check, for example. The PCIe bridge 24 outputs the result of the parity check to the failure detecting unit 21. The PCIe bridge 24 transmits data to the PCIe bridge 14 of the CM 1. In this case, the PCIe bridge 24 transmits data even when an error is found as a result of the data parity check. The PCIe bridge 24 corresponds to an example of a "first bus connecting unit".

The failure detecting unit 21 determines whether a predetermined type of error such as a parity error is occurring at the PCIe bridge 24 or not. For example, the failure detecting unit 21 acquires the result of the parity check from the PCIe bridge 24. If a parity error is occurring, the failure detecting unit 21 then determines that the predetermined error has occurred at the PCIe bridge 24. The failure detecting unit 21 determines the transmitted data as error data. The failure detecting unit 21 determines that the PCIe bridge 24 has a failure. The failure detecting unit 21 instructs the data transmitting unit 23 to retransmit the failure data having the error. The failure detecting unit 21 corresponds to an example of a "first failure detecting unit".

The control unit 22 receives the notification of the detection of the failure at the PCIe bridge 24 in the failure detecting unit 21. If the failure detection notification is not received from the failure detecting unit 21 during data retransmission, the control unit 22 determines that the data retransmission has been performed normally. The control unit 22 counts the number of times of the failure detection by the failure detecting unit 21 during the data retransmission. If the counted number of times reaches a predetermined number of times, the control unit 22 determines that the retransmission has been performed a predetermined number of times. If the data transmitting unit 23 has retransmitted data normally or the data transmitting unit 23 has retransmitted data a predetermined number of times, the control unit 22 shuts down the CM 2.

The PCIe bridge 14 connects between the bus of the CM 1 and the bus of the CM 2 along with the PCIe bridge 24 and allows data exchange between the CM 1 and CM 2. The PCIe bridge 14 receives data from the PCIe bridge 24. The PCIe bridge 14 receives the data retransmitted by the data transmitting unit 23 through the PCIe bridge 24. The PCIe bridge 14 then performs parity check on the received data. The PCIe bridge 14 transmits the received data to the data writing unit 13. In this case, the PCIe bridge 14 transmits the data even when an error is found as a result of the data parity check. The PCIe bridge 14 corresponds to an example of a "second bus connecting unit".

The data writing unit 13 receives the data transmitted from the data transmitting unit 23 through the PCIe bridge 14. The data writing unit 13 receives the data retransmitted by the data transmitting unit 23 through the PCIe bridge 14. The data writing unit 13 then performs parity check on the received data. The data writing unit 13 writes the received data to the memory 15. In this case, the data writing unit 13 writes data even when an error is found as a result of the data parity check.

The failure detecting unit 11 stores a predetermined type of error including a parity error as a predetermined error. The failure detecting unit 11 determines whether a predetermined error is occurring in the PCIe bridge 14 and data writing unit 13 or not. For example, the failure detecting unit 11 acquires a result of parity check from the PCIe bridge 14 and data writing unit 13. If the result of parity check has an error, the failure detecting unit 11 determines that a predetermined error is occurring. The failure detecting unit 11 then determines that the data having the error as error data. The failure detecting unit 11 then issues a notification on occurrence of the error to the control unit 12. The failure detecting unit 11 corresponds to an example of a "second failure detecting unit".

The control unit 12 determines whether the error data has been transmitted from the CM 2 or not. According to an example method for the determination, the control unit 12 may determine that the error data has been transmitted from the CM 2 connected to the PCIe bridge 14 because the error data is causing a parity error in the PCIe bridge 14 and data writing unit 13. According to another example method, the control unit 12 acquires the data determined as the error data from the data writing unit 13 and checks the source on the basis of the header of the acquired data, for example. The control unit 12 may determine whether the data has been transmitted from the CM 2 or not.

If the control unit 12 determines that the data having the error as a result of the parity check has been transmitted from the CM 2, the control unit 12 instructs the PCIe bridge 14 and data writing unit 13 to wait until the data having the error is retransmitted. On the other hand, if the error data is not transmitted from the CM 2 or if the failure detecting unit 11 detects an error excluding the predetermined error such as a parity error, the control unit 12 shuts down the CM 1. The control unit 12 corresponds to an example of a "control unit".

Figure 2:
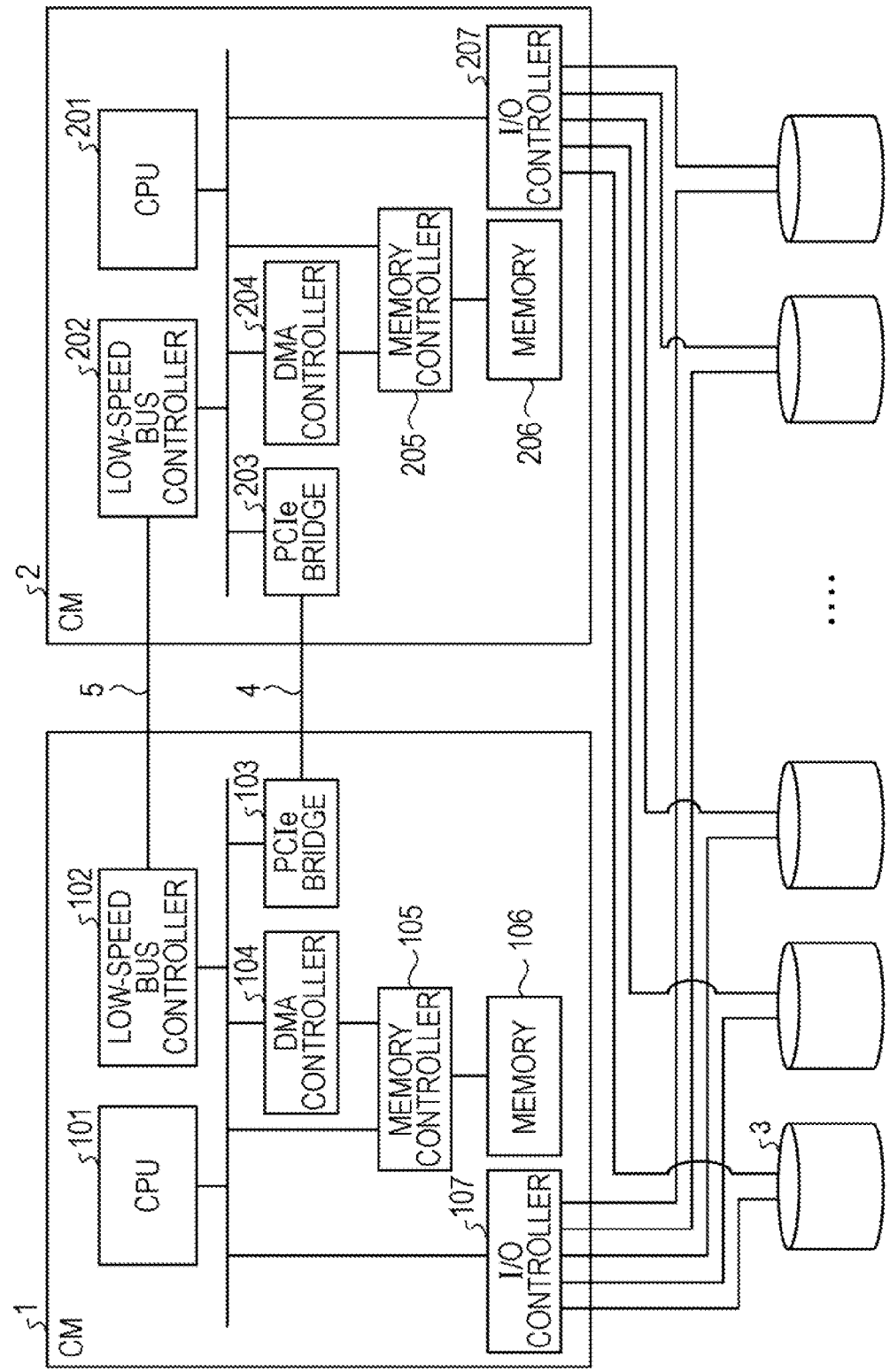
FIG. 2 is a hardware configuration diagram illustrating an entire configuration of hardware of a storage apparatus.

FIG. 2 is a hardware configuration diagram illustrating an entire configuration of hardware of a storage apparatus. Next, with reference to FIG. 2, a configuration of the entire storage apparatus and the entire operation flow will be described. As illustrated in FIG. 2, the storage apparatus has the CM 1, the CM 2 and a hard disk 3. As illustrated in FIG. 2, though the storage apparatus has a plurality of hard disks, they will be collectively called the hard disk 3.

The CM 1 has a CPU 101, a low-speed bus controller 102, a PCIe bridge 103, a DMA (Direct Memory Access) controller 104, a memory controller 105, a memory 106 and an I/O controller 107. The CM 2 also has a CPU 201, a low-speed bus controller 202, a PCIe bridge 203, a DMA controller 204, a memory controller 205, a memory 206 and an I/O controller 207. The buses of the CM 1 and CM 2 are connected to the host though not illustrated in FIG. 2.

Data writing and reading operations from the host in the storage apparatus will be described. The operation in the CM 1 will be described, for example, because the CM 1 and CM 2 perform the same operations.

The CPU 101 in response to an instruction to write data from the host instructs the memory controller 105 to write the data transmitted from the host to the memory 106. The CPU 101 further instructs the I/O controller 107 to write the data stored in the memory 106 to the hard disk 3. The CPU 101 in response to an instruction to perform data reading from the host instructs the I/O controller 107 to read the designated data from the hard disk 3 and transmit the data to the host.

The memory controller 105 in response to an instruction to perform data writing from the CPU 101 writes the data received from the host to the memory 106. The memory controller 105 transmits the data stored in the memory 106 to the I/O controller 107.

The I/O controller 107 in response to an instruction to perform data writing from the CPU 101 receives the data stored in the memory 106 from the memory controller 105 and writes the data to the hard disk 3. The I/O controller 107 in response to a data reading instruction from the CPU 101 reads designated data from the hard disk 3.

The low-speed bus controller 102 and low-speed bus controller 202 are connected to a path 5. In response to an instruction from the CPU 101 and CPU 201, the low-speed bus controller 102 and low-speed bus controller 202 exchange control information between the CPU 101 and the CPU 201. Because the control information is small in size, the path 5 may have a lower transfer rate than that of a path 4. According to this embodiment, the path 5 has a transfer rate of several tens KB/sec.

Next, duplexing data on memories in the CM 1 and CM 2 will be described. It is assumed here that data in the memory 106 in the CM 1 is copied and duplexed to the memory 206 in the CM 2.

The DMA controller 104 receives data written to the memory 106 by the memory controller 105 from the memory controller 105. The DMA controller 104 passes the data to the PCIe bridge 103 in order to write the data to the memory 206 in the CM 2.

The PCIe bridge 103 transmits the data received from the DMA controller 104 through the path 4 to the PCIe bridge 203 of the CM 2.

The path 4 is a high-speed path for data transmission. For example, according to this embodiment, the path 4 has a transfer rate of 700 MB/sec.

The PCIe bridge 203 receives the data from the PCIe bridge 103.

The DMA controller 204 acquires the data received by the PCIe bridge 103, passes the acquired data to the memory controller 205 and instructs the memory controller 205 to write the data to the memory 206.

The memory controller 205 in response to the instruction for data writing from the DMA controller 204 writes the data to the memory 206.

In this way, writing data stored in one memory to the other memory may also keep the data in the memory of the other CM even when one CM fails.

The DMA controller 204 and memory controller 205 have the function of the data transmitting unit 23 in FIG. 1. The DMA controller 204 has the function of the failure detecting unit 21 in FIG. 1. The memory 206 has the function of the volatile storage unit 25 in FIG. 1. The PCIe bridge 203 has the function of the bus connecting unit 24 in FIG. 1. The CPU 201 has the function of the control unit 22 in FIG. 1.

The PCIe bridge 103 has the function of the bus connecting unit 14 in FIG. 1. The DMA controller 104 and memory controller 105 have the function of the data writing unit 13 in FIG. 1. The memory 106 has the function of the non-volatile storage unit 15 in FIG. 1. The CPU 101 has the functions of the control unit 12 and failure detecting unit 11 in FIG. 1.

Figure 3:
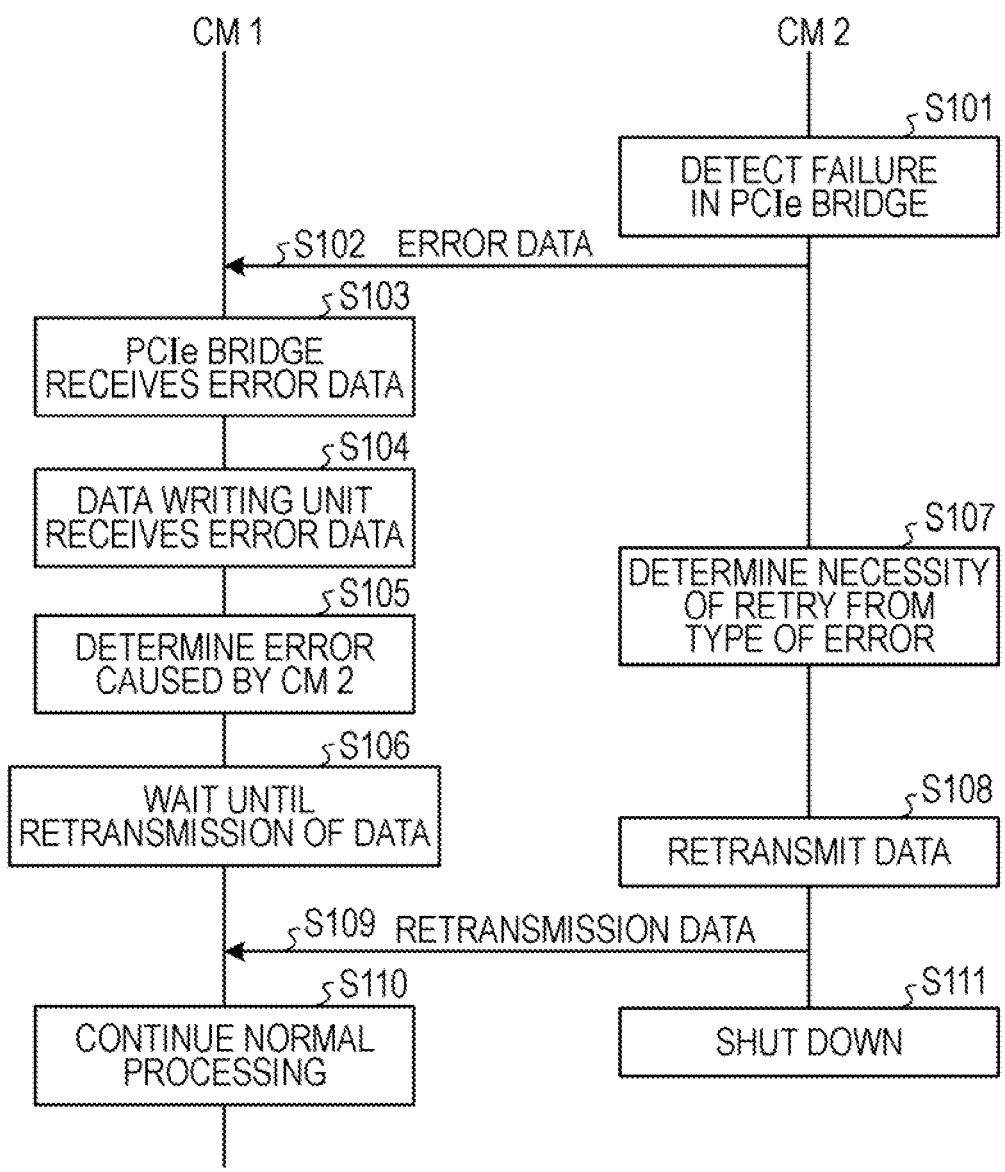
FIG. 3 is a sequence diagram of processing upon occurrence of a parity error during data duplexing in a storage apparatus according to the first embodiment.

Next, with reference to FIG. 3, there will be described a flow of processing upon occurrence of a parity error during data duplexing in a storage apparatus according to this embodiment. FIG. 3 is a sequence diagram of processing upon occurrence of a parity error during data duplexing in a storage apparatus according to the first embodiment. The vertical axes in FIG. 3 represent the passage of time toward the bottom of FIG. 3. The processes on the vertical axes represent processes to be performed by the CMs at the upper part of FIG. 3. The arrows connecting the vertical axes represent data transmission in the directions indicated by the arrows.

The data transmitting unit 23 of the CM 2 transmits data stored in the memory 25 to the CM 1 through the PCIe bridge 24. The failure detecting unit 21 receives the result of parity check from the PCIe bridge 24. The failure detecting unit 21 may determine that an error is found in the received parity check result and detects an error in the PCIe bridge 24 (operation S101).

The error data describing that there is an error in the parity check result is transmitted from the PCIe bridge 24 to the PCIe bridge 14 (operation S102).

The PCIe bridge 14 receives the error data describing there is an error in the parity check result (operation S103). In this case, the PCIe bridge 14 performs parity check on the received data and transmits the check result to the failure detecting unit 11.

The data writing unit 13 receives the error data describing there is an error in the parity check result from the PCIe bridge 14 (operation S104). In this case, the data writing unit 13 performs parity check on the received data and transmits the check result to the failure detecting unit 11.

The failure detecting unit 11 determines that an error is occurring from the received parity check result and notifies it to the control unit 12. The control unit 12 determines that the error occurring in the PCIe bridge 14 and data writing unit 13 is caused by the CM 2 (operation S105).

The control unit 12 causes the PCIe bridge 14 and data writing unit 13 to wait until they receive the data retransmitted from the CM 2 (operation S106).

During this, the failure detecting unit 21 of the CM 2 determines that retry is to be performed from the error type that is a parity error (operation S107). The data transmitting unit 23 retransmits the data transmitted last time to the CM 1 (operation S108).

The retransmission data is transmitted from the CM 2 to the CM 1 (operation S109). In this case, the data transmitting unit 23 performs the data retransmission until no error is found in data parity check or a predetermined number of times.

The control unit 12 of the CM 1 causes the components of the CM 1 to perform their normal processing (operation S110).

The control unit 22 of the CM 2 shuts down the CM 2 (operation S111).

As described above, in a storage apparatus according to this embodiment, when the CM that transmits data has an error such as a parity error at a PCIe bridge thereof, the CM that receives the data is not shut down even though the error data causes an error in the CM that receives the data. The retransmission of data having a parity error, for example, may contribute to avoidance of the state that the error data is kept in a memory of the CM that receives the data.

Variation Examples

Next, a variation example of the storage apparatus according to the first embodiment will be described. According to the first embodiment, when data has a parity error, the data having the error is simply retransmitted. However, according to a variation example, the load of the data transfer on the path between the CM 1 and the CM 2 may be reduced before the data retransmission.

More specifically, in the storage apparatus according to the variation example, the CM 1 also has a data transmitting unit, not illustrated. The CM 1 receives data from the host and temporarily stores the received data to the memory 15. The data transmitting unit in the CM 1 corresponds to an example of a "transmitting unit".

The data transmitting unit of the CM 1 copies the data stored in the memory 15 to the memory 25 of the CM 2. In other words, according to this variation example, the duplexed data is transmitted from both of the CM 1 and the CM 2. The function of the data transmitting unit is provided to the DMA controller 104 and memory controller 105 in FIG. 2.

Regarding this point, when the data transfer load is high on the path (the "path 4" in FIG. 2) between the PCIe bridge 14 and the PCIe bridge 24, the possibility of occurrence of an error at the PCIe bridge 24 may increase. Accordingly, the control unit 12 of this variation example stops the data copy by the data transmitting unit in the CM 1 to the memory 25 in the CM 2. When it is determined that the data having an error found as a result of parity check is transmitted from the CM 2, that is, under the state where an error is occurring, the data is transmitted from both of the CM 1 and the CM 2. Thus, the load is higher on the path between the CM 1 and the CM 2. Stopping the transmission of the data from the CM 1 may reduce the load on the path between the CM 1 and the CM 2.

After the data transmission from the CM 1 stops, the data transmitting unit 23 in the CM 2 retransmits the data having the error.

Thus, the occurrence of an error due to the high load of the data transfer on the path may be avoided, and the possibility that the data may be retransmitted normally may be increased. The storage apparatus according to this variation example may increase the avoidance rate of the state that error data is kept in a memory of the CM that receives the data.

Second Embodiment

Figure 4:
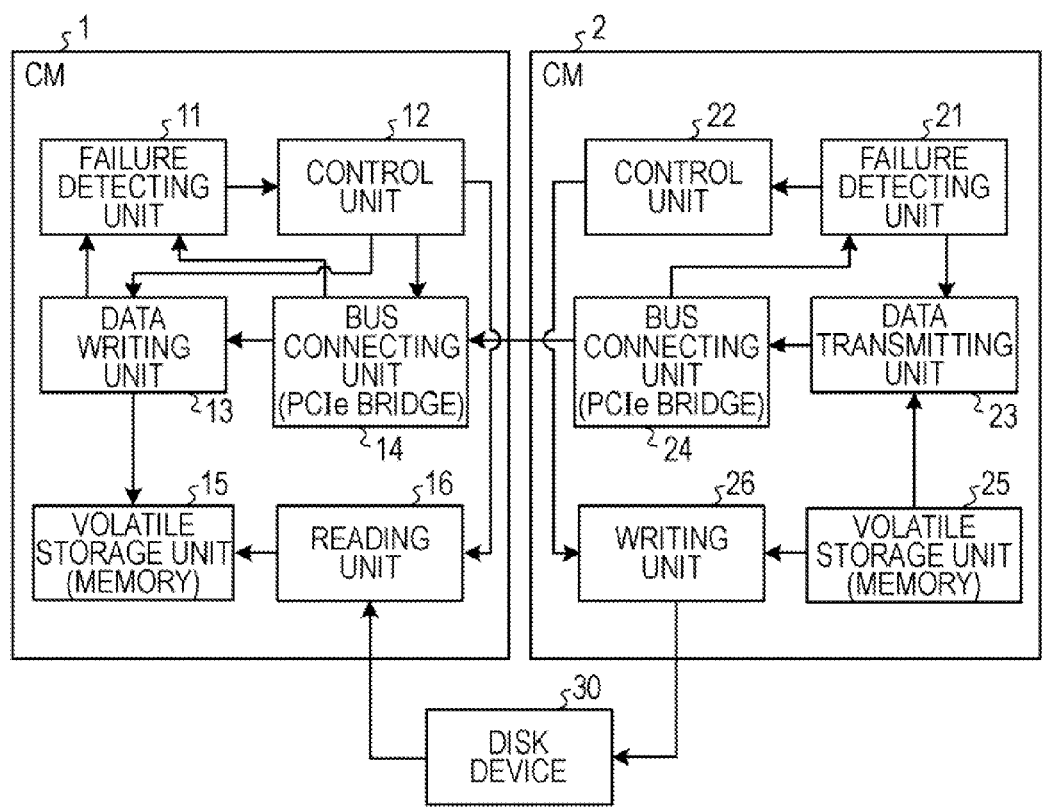
FIG. 4 is a block diagram of a controller module according to a second embodiment.

FIG. 4 is a block diagram of a controller module according to a second embodiment. The controller module according to this embodiment is different from the first embodiment in that, when the retransmission of data having an error is not performed normally, the data may be copied to the data receiver side memory through a hard disk. Hereinafter, data copy through a hard disk will be mainly described.

A CM according to this embodiment includes a reading unit 16 and a writing unit 26 in addition to the CM of the first embodiment as illustrated in FIG. 4. Here, it is assumed that the components in FIG. 4 having the same reference numerals as those in FIG. 1 may have the same functions otherwise particularly indicated. The hardware configuration of the storage apparatus according to this embodiment is the same as the one in FIG. 2.

According to this embodiment, the reading unit 16 and writing unit 26 are connected to a disk device 30. According to this embodiment, the disk device 30 has the hard disk 3 in FIG. 2. Hereinafter, data writing or reading to or from the hard disk 3 of the disk device 30 will be called data writing or reading to or from the disk device 30.

The control unit 22 of the CM 2 counts the number of times of the error detection by the failure detecting unit 21 during the data retransmission. If the counted number of times reaches a predetermined number of times, the control unit 22 determines that the data having the error has not been retransmitted normally. If it is determined that the retransmission has not been performed normally, the control unit 22 instructs the writing unit 26 to write the data in which an error has occurred during the transmission to the disk device 30. After the writing unit 26 writes the data to the disk device 30, the control unit 22 shuts down the CM 2. The control unit 22 corresponds to an example of a "write control unit".

The writing unit 26 receives, from the control unit 22, an instruction to write the data having an error during the transmission to the disk device 30. The writing unit 26 reads the data having an error during the transmission from the memory 25. The writing unit 26 writes the data read from the memory 25 to the disk device 30. The function of the writing unit 26 is provided in the I/O controller 207 in FIG. 2.

The control unit 12 of the CM 1 has a counter. The control unit 12 stores a predetermined value as a threshold value for determining a retransmission error of data. The control unit 12 in response to the notification of error occurrence from the failure detecting unit 11 increments its counter. If the counter reaches a predetermined value, the control unit 12 determines that the data retransmission has failed. The retransmission failure may be determined by the control unit 12 by using other methods. For example, the control unit 12 may prestore a predetermined time as a threshold value and may determine a retransmission failure if the data having an error is not received normally within a predetermined period of time after the notification of error occurrence from the failure detecting unit 11. The control unit 12 receives identification information on the data having an error from the failure detecting unit 11. The control unit 12 waits until the CM 2 is shut down. For example, when the CM 1 and the CM 2 are running, heartbeats may be transmitted mutually between the control unit 12 and the control unit 22 through the path 5 in FIG. 2, for example. Thus, the control unit 12 determines that the CM 2 has shut down when no heartbeats are received from the control unit 22. According to another method for detecting a retransmission failure, the control unit 12 may determine that retransmission has failed if the CM 2 shuts down before the data having an error is received normally after receiving an error occurrence notification from the failure detecting unit 11.

When the CM 2 shuts down, the control unit 12 uses the identification information of the data having an error received from the failure detecting unit 11 to instruct the reading unit 16 to read the data failed to retransmit from the disk device 30 and store it to the memory 15. The control unit 12 returns to the normal processing if the data is stored to the memory 15.

The reading unit 16 receives from the control unit 12 the instruction to read the data failed to retransmit from the disk device 30 and store it to the memory 15. The reading unit 16 reads the data failed to retransmit from the disk device 30. The reading unit 16 stores the data read from the disk device 30 to the memory 15. The function of the reading unit 16 has an I/O controller 107 in FIG. 2.

Figure 5:
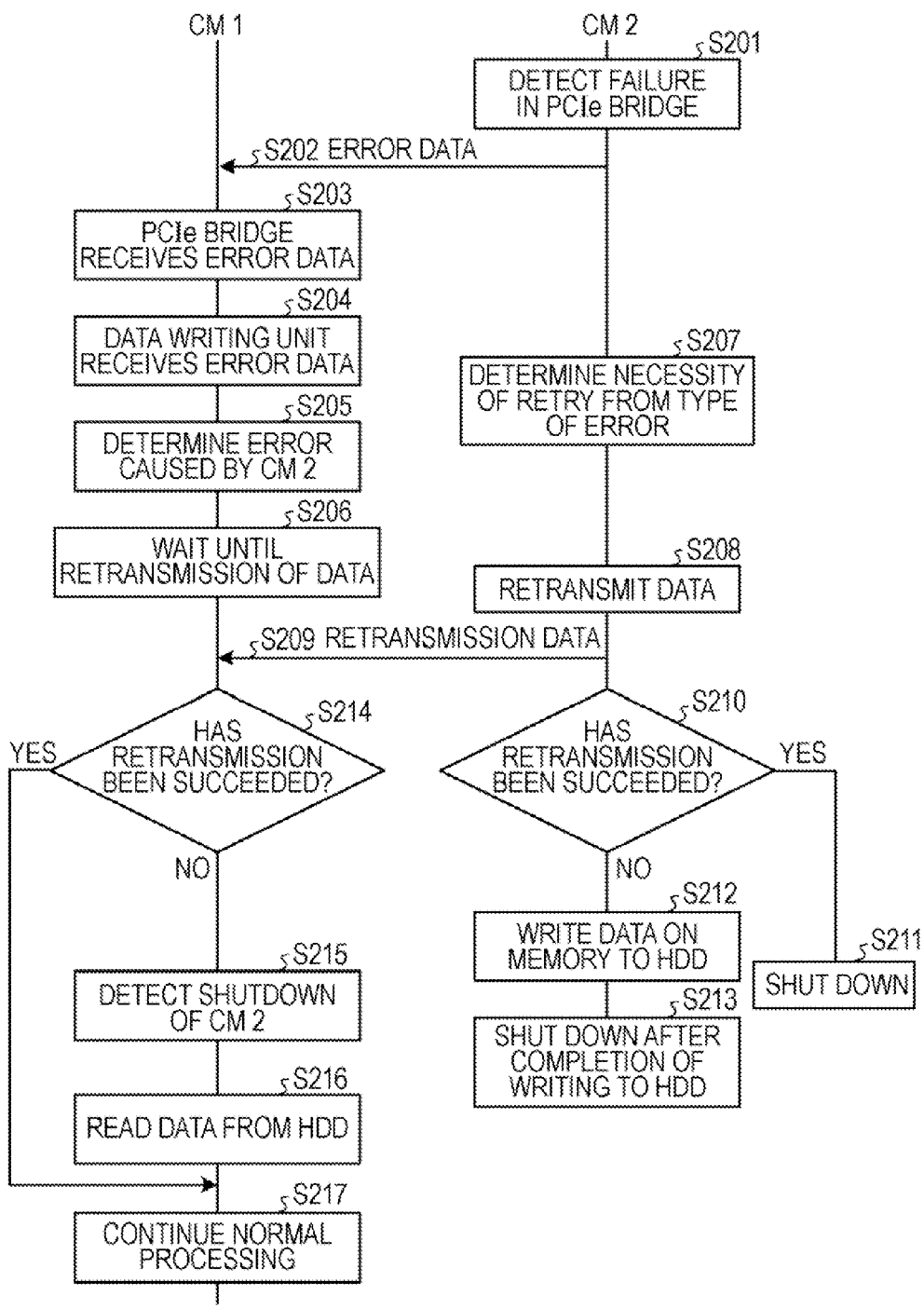
FIG. 5 is a sequence diagram of processing upon occurrence of a parity error during data duplexing in a storage apparatus according to the second embodiment.

Next, with reference to FIG. 5, there will be described a flow of processing upon occurrence of a parity error during data duplexing in a storage apparatus according to this embodiment. FIG. 5 is a sequence diagram of processing upon occurrence of a parity error during data duplexing in a storage apparatus according to the second embodiment.

The data transmitting unit 23 of the CM 2 transmits data stored in the memory 25 to the CM 1 through the PCIe bridge 24. The failure detecting unit 21 receives the result of parity check from the PCIe bridge 24. The failure detecting unit 21 detects a parity error from the received parity check result. The failure detecting unit 21 detects a failure in the PCIe bridge 24 (operation S201).

The error data having the parity error is transmitted from the PCIe bridge 24 to the PCIe bridge 14 (operation S202).

The PCIe bridge 14 receives the error data having the parity error (operation S203). In this case, the PCIe bridge 14 performs parity check on the received data and transmits the check result to the failure detecting unit 11.

The data writing unit 13 receives the error data having the parity error from the PCIe bridge 14 (operation S204). In this case, the data writing unit 13 performs parity check on the received data and transmits the check result to the failure detecting unit 11.

The failure detecting unit 11 detects a parity error from the received parity check result and notifies it to the control unit 12. The control unit 12 determines that the failure occurring in the PCIe bridge 14 and data writing unit 13 is caused by the CM 2 (operation S205).

The control unit 12 causes the PCIe bridge 14 and data writing unit 13 to wait until they receive the data retransmitted from the CM 2 (operation S206).

During this, the failure detecting unit 21 of the CM 2 determines that retry is to be performed from the error type that is a parity error (operation S207). The data transmitting unit 23 retransmits the data transmitted last time to the CM 1 (operation S208).

The retransmission data is transmitted from the CM 2 to the CM 1 (operation S209).

The control unit 22 determines whether the data retransmission by the data transmitting unit 23 has been performed successfully or not (operation S210). If so (Yes in operation S210), the control unit 22 shuts down the CM 2 (operation S211).

If not on the other hand (No in operation S210), the control unit 22 instructs the writing unit 26 to write the data failed to retransmit stored in the memory 25 to the disk device 30. The writing unit 26 reads the data failed to retransmit from the memory 25 and writes the read data to the disk device 30 (operation S212).

When the data failed to retransmit has been written to the disk device 30 completely, the control unit 22 shuts down the CM 2 (operation S213).

The control unit 12 of the CM 1 determines whether the data retransmission has been performed successfully or not (operation S214). If not (No in operation S214), the control unit 12 waits until the CM 2 shuts down and detects the shutdown of the CM 2 after that (operation S215).

The control unit 12 instructs the reading unit 16 to read the data failed to retransmit from the disk device 30 and write it to the memory 15. The reading unit 16 in response to the instruction reads the data failed to retransmit from the disk device 30 and stores the read data to the memory 15 (operation S216).

If the data retransmission has been performed successfully (Yes in operation S214) or if the data failed to retransmit and written to the disk device 30 is stored to the memory 15 completely, the control unit 12 continues the normal processing (operation S217).

As described above, the storage apparatus of this embodiment may move data to a memory of the data receiver side CM through a hard disk even when data retransmission by a DMA fails. This may increase the avoidance rate of the state that error data is kept in a memory of the CM that receives the data.

Variation Examples

Figure 6:
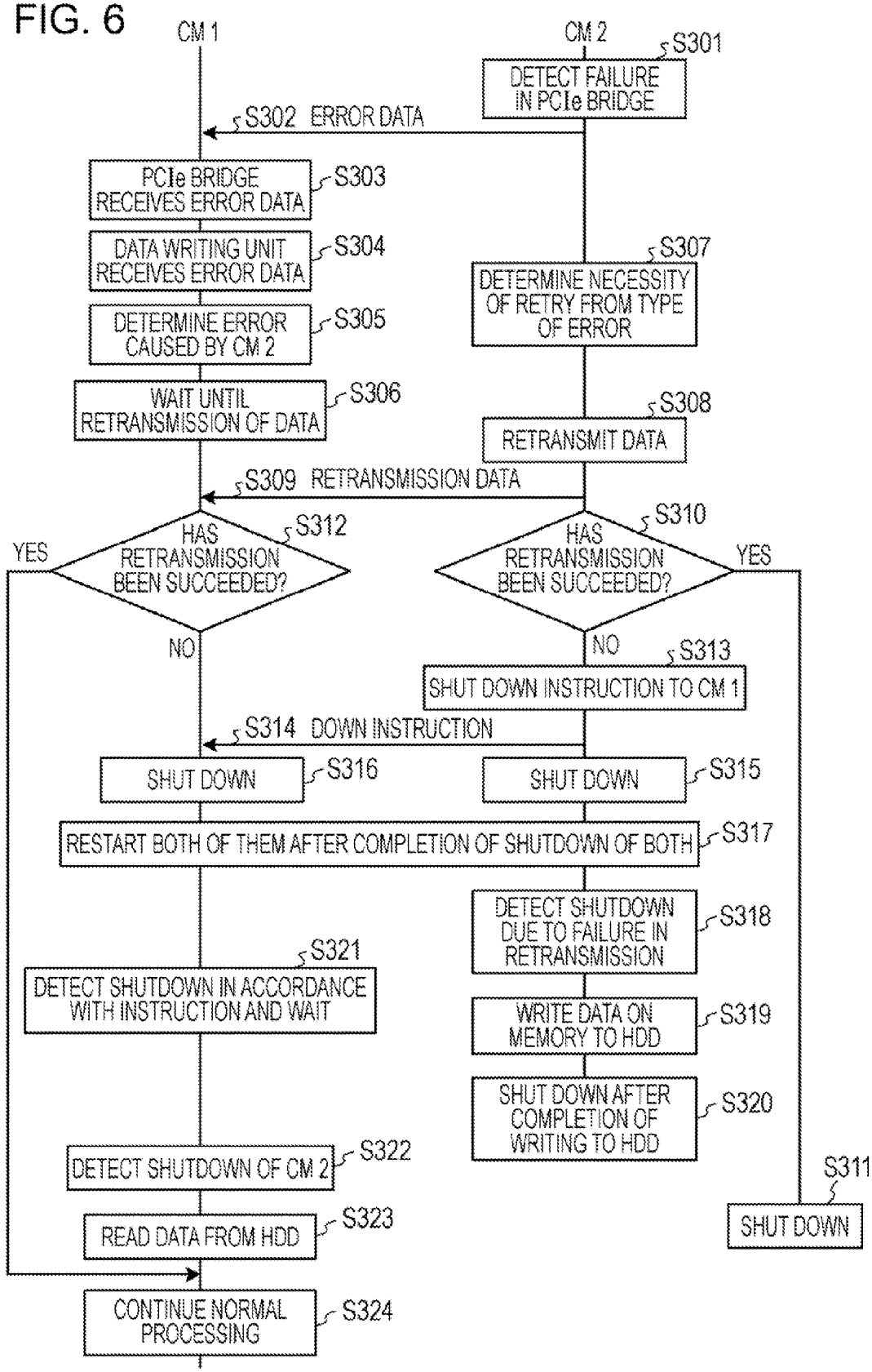
FIG. 6 is a sequence diagram of processing upon occurrence of a parity error during data duplexing in a storage apparatus according to a variation example of the second embodiment.

Next, a variation example of the storage apparatus according to the second embodiment will be described. A storage apparatus of this variation example has a function of keeping the content of memories and restarting even when both of the CM 1 and CM 2 shut down. The storage apparatus according to this embodiment uses the function to restart the CM 1 and CM 2 and then moves the data failed to retransmit to a memory of the CM 1 through the hard disk. FIG. 6 is a sequence diagram of processing upon occurrence of a parity error during data duplexing in a storage apparatus according to a variation example of the second embodiment. With reference to FIG. 6, a flow of processing to be performed upon occurrence of a parity error during data duplexing in a storage apparatus according to the variation example.

The data transmitting unit 23 of the CM 2 transmits the data stored in the memory 25 to the CM 1 through the PCIe bridge 24. The failure detecting unit 21 receives the result of parity check from the PCIe bridge 24. The failure detecting unit 21 detects a parity error from the received parity check result. The failure detecting unit 21 detects a failure in the PCIe bridge 24 (operation S301).

The error data having the parity error is transmitted from the PCIe bridge 24 to the PCIe bridge 14 (operation S302).

The PCIe bridge 14 receives the error data having the parity error (operation S303). In this case, the PCIe bridge 14 performs parity check on the received data and transmits the check result to the failure detecting unit 11.

The data writing unit 13 receives the error data having the parity error from the PCIe bridge 14 (operation S304). In this case, the data writing unit 13 performs parity check on the received data and transmits the check result to the failure detecting unit 11.

The failure detecting unit 11 detects a parity error from the received parity check result and notifies it to the control unit 12. The control unit 12 determines that the failure occurring in the PCIe bridge 14 and data writing unit 13 is caused by the CM 2 (operation S305).

The control unit 12 causes the PCIe bridge 14 and data writing unit 13 to wait until they receive the data retransmitted from the CM 2 (operation S306).

During this, the failure detecting unit 21 of the CM 2 determines that retry is to be performed from the error type that is a parity error (operation S307). The data transmitting unit 23 retransmits the data transmitted last time to the CM 1 (operation S308).

The retransmission data is transmitted from the CM 2 to the CM 1 (operation S309).

The control unit 22 determines whether the data retransmission by the data transmitting unit 23 has been performed successfully or not (operation S310). If so (Yes in operation S310), the control unit 22 shuts down the CM 2 (operation S311).

If not on the other hand (No in operation S310), the control unit 22 instructs the CM 1 to shut down (operation S313).

The shutdown instruction is transmitted to the CM 1 (operation S314).

After transmitting the shutdown instruction, the control unit 22 shuts down the CM 2 (operation S315). In this case, the control unit 22 shuts down the CM 2 after data on the memory 25 is moved to a device for backup such as a non-volatile memory.

On the other hand, the control unit 12 of the CM 1 also determines whether the data retransmission has been performed successfully or not (operation S312). If the data retransmission fails (No in operation S312), the control unit 12 in response to the shutdown instruction from the CM 2 to shut down the CM 1 (operation S316). Also in this case, the control unit 12 shuts down the CM 1 after the data on the memory 15 is moved to a device for backup such as a non-volatile memory.

After the completion of the shutdown of the CM 1 and CM 2, the storage apparatus restarts both of them (operation S317). In this case, the shutdown of both of the CM 1 and CM 2 may be monitored and be restarted by a control unit of the CM which has shut down later, for example. Alternatively, a monitor control unit may further be provided which monitors the shutdown of both of the CM 1 and CM 2, and the monitor control unit may restart them. Upon start, both of the CM 1 and CM 2 expand the data held in a device for backup after the start onto their own memories.

The control unit 22 of the CM 2 detects the retransmission failure resulting in the shutdown by checking logs after the restart (operation S318). The control unit 22 instructs the writing unit 26 to write the data failed to retransmit stored in the memory 25 to the disk device 30. The writing unit 26 reads the data failed to retransmit form the memory 25 and writes the read data to the disk device 30 (operation S319).

After the data failed to retransmit is written to the disk device 30 completely, the control unit 22 shuts down the CM 2 (operation S320).

The control unit 12 checks logs after the restart to detect the shut down in response to the instruction from the CM 2 and waits until it detects the shutdown of the CM 2 (operation S321). After that, the control unit 12 detects the shutdown of the CM 2 (operation S322).

The control unit 12 instructs the reading unit 16 to read the data failed to retransmit from the disk device 30 and writes it to the memory 15. The reading unit 16 in response to the instruction reads the data failed to retransmit from the disk device 30 and stores the read data to the memory 15 (operation S323).

If the data retransmission has been performed successfully (Yes in operation S312) or the data failed to retransmit and written to the disk device 30 has completely been stored to the memory 15, the control unit 12 continues the normal processing (operation S324).

As described above, the storage apparatus according to this variation example may use the function of starting both of the CMs by holding the information in the memories if the CMs are shut down to perform data migration through a hard disk.

Third Embodiment

Figure 7:
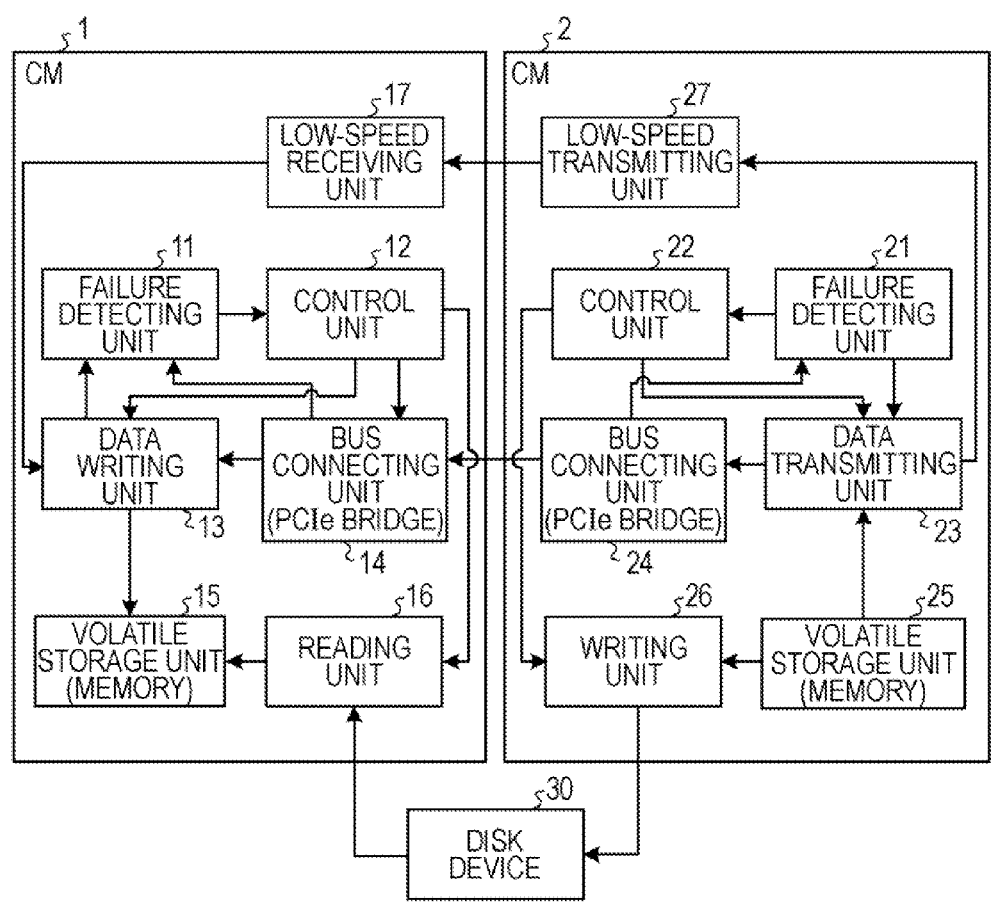
FIG. 7 is a block diagram of a controller module according to a third embodiment.

FIG. 7 is a block diagram of a controller module according to a third embodiment. The controller module according to this embodiment is different from the second embodiment in that when data having an error is not retransmitted normally, a transmission path having a lower transfer rate than the path between the PCIe bridges to transmit data. Hereinafter, data transmission by using a transmission path having a low transfer rate will be described.

A CM according to this embodiment further includes a low-speed receiving unit 17 and a low-speed transmitting unit 27 in addition to the CMs in the second embodiment, as illustrated in FIG. 7. It is assumed here that like numbers refer to like components in FIG. 4 and FIG. 7, and the components have like functions otherwise indicated particularly. The hardware configuration of a storage apparatus according to this embodiment is the same as that in FIG. 2.

The low-speed bus controller 202 in FIG. 2 has the function of the low-speed transmitting unit 27, and the low-speed bus controller 102 has the function of the low-speed receiving unit 17. The path 5 connecting between the low-speed bus controller 102 and the low-speed bus controller 202 corresponds to the transmission path having a low transfer rate. As described above, according to this embodiment, the path 5 has a transfer rate of several tens KB/sec. The transmission path having a low transfer rate corresponds to an example of the "low-speed transmission path".

The low-speed transmitting unit 27 uses the transmission path having a low transfer rate to transmit data to the low-speed receiving unit 17.

The control unit 22 receives the notification of the detection of a failure from the failure detecting unit 21.

If the control unit 22 of the CM 2 receives the notification of the detection of a failure from the failure detecting unit 21, the control unit 22 acquires the size of the data having the error from the data transmitting unit 23. The control unit 22 stores a predetermined size as a threshold value for determining whether the transmission through the low-speed transmission path is possible or not. According to this embodiment, the control unit 22 stores "1 KB" as the predetermined size.

The control unit 22 determines whether the data having an error has a size of 1 KB or lower or not. If so, the control unit 22 instructs the data transmitting unit 23 to transmit the data having an error through the low-speed transmitting unit 27. If the data transmission through the transmission path having a low transfer rate completes, the control unit 22 shuts down the CM 2. According to this embodiment, because the bus 5 has a transfer rate of several tens KB/sec, the threshold value 1 KB/sec is set as the enough size for transferring data through the path 5. However, the threshold value is preferably determined in accordance with the real transfer rate of the transmission path having a low transfer rate.

On the other hand, if the data having an error has a larger size than 1 KB, the control unit 22 instructs the data transmitting unit 23 to retransmit the data having an error. If the control unit 22 does not receive the notification of failure detection from the failure detecting unit 21 in the data retransmission, the control unit 22 determines that the retransmission has completed without any parity error. After that, the control unit 22 shuts down the CM 2. If the number of times of detection of a failure by the failure detecting unit 21 reaches a predetermined number of times in the data retransmission, the control unit 22 instructs the writing unit 26 to write the data having an error to the disk device 30. If the writing unit 26 finishes the data writing to the disk device 30, the control unit 22 shuts down the CM 2.

The data transmitting unit 23 receives the instruction to transmit the data having an error through the low-speed transmitting unit 27 from the control unit 22 and transmits the data having an error to the low-speed transmitting unit 27. In response to the instruction to retransmit the data having an error, the data transmitting unit 23 transmits the data having an error to the CM 1 through the PCIe bridge 24.

The low-speed transmitting unit 27 receives the data having an error from the data transmitting unit 23. The low-speed transmitting unit 27 transmits the data having an error through the transmission path having a low transfer rate to the low-speed receiving unit 17.

The low-speed receiving unit 17 of the CM 1 receives the data through the transmission path having a low transfer rate from the low-speed transmitting unit 27. The low-speed receiving unit 17 transmits the received data to the data writing unit 13.

The data writing unit 13 receives data from the low-speed receiving unit 17. The data writing unit 13 writes the received data to the memory 15.

If the data having an error received through the low-speed receiving unit 17 is stored to the memory 15, the control unit 12 returns to the normal processing.

On the other hand, if data having an error is not transmitted through the low-speed receiving unit 17, the control unit 12 instructs the PCIe bridge 14 and data writing unit 13 to receive the retransmitted data having an error. If the retransmission of the data having an error is performed normally, the control unit 12 returns to the normal processing. On the other hand, if the number of times of retransmission exceeds a predetermined value, the control unit 12 after notified of the shutdown of the CM 2 instructs the reading unit 16 to store the data failed to retransmit stored in the disk device 30 to the memory 15.

With reference to FIG. 8, a flow of processing to be performed upon occurrence of a parity error during data duplexing in a storage apparatus according to this embodiment. FIG. 8 is a sequence diagram of processing upon occurrence of a parity error during data duplexing in a storage apparatus according to a variation example of the third embodiment.

The data transmitting unit 23 of the CM 2 transmits the data stored in the memory 25 to the CM 1 through the PCIe bridge 24. The failure detecting unit 21 receives the result of parity check from the PCIe bridge 24. The failure detecting unit 21 detects a parity error from the received parity check result. The failure detecting unit 21 detects a failure in the PCIe bridge 24 (operation S401)

The error data having the parity error is transmitted from the PCIe bridge 24 to the PCIe bridge 14 (operation S402).

The PCIe bridge 14 receives the error data having the parity error (operation S403). In this case, the PCIe bridge 14 performs parity check on the received data and transmits the check result to the failure detecting unit 11.

The data writing unit 13 receives the error data having the parity error from the PCIe bridge 14 (operation S404). In this case, the data writing unit 13 performs parity check on the received data and transmits the check result to the failure detecting unit 11.

The failure detecting unit 11 detects a parity error from the received parity check result and notifies it to the control unit 12. The control unit 12 determines that an error occurring in the PCIe bridge 14 and data writing unit 13 is caused by the CM 2 (operation S405).

The control unit 12 causes the PCIe bridge 14 and data writing unit 13 to wait until they receive the data having an error from the CM 2 (operation S406).

During this, the failure detecting unit 21 of the CM 2 determines that retry is to be performed from the failure type that is a parity error (operation S407).

The control unit 22 determines whether the data having an error has a size that is equal to or lower than 1 KB or not (operation S408). If so (Yes in operation S408), the control unit 22 instructs the data transmitting unit 23 to transmit the data having the error to the CM 1 through the path 5. The data transmitting unit 23 in response to the instruction from the control unit 22 transmits the data having an error to the CM 1 through the path 5 (operation S409). After transmitting the data having an error through the path 5, the control unit 22 shuts down the CM 2 (operation S411).

The data having an error is transmitted to the data writing unit 13 through the low-speed transmitting unit 27, path 5 and low-speed receiving unit 17 (operation S410). The data writing unit 13 receives the data through the path 5 and writes it to the memory 15.

The control unit 21 monitors the low-speed receiving unit 17 and data writing unit 13 to determine whether the data has been received through the bus 5 or not (operation S412). For example, the control unit 21 determines the data reception on the basis of information that data from the low-speed receiving unit 17 is received through the low-speed transmitting unit 27 and information that data from the data writing unit 13 is received through the low-speed receiving unit 17. If data is received through the path 5 (Yes in operation S412), the control unit 21 continues the normal processing (operation S421).

On the other hand, if the data having the error has a size that is larger than 1 KB (No in operation S408), the data transmitting unit 23 retransmits the data transmitted last time to the CM 1 through the path 4 (operation S413).

The retransmission data is transmitted from the CM 2 to the CM 1 (operation S414).

The control unit 22 determines whether the data retransmission by the data transmitting unit 23 has been performed successfully or not (operation S415). If so (Yes in operation S415), the control unit 22 shuts down the CM 2 (operation S411).

If the data retransmission fails on the other hand (No in operation S415), the control unit 22 instructs the writing unit 26 to write the data failed to retransmit stored in the memory 25 to the disk device 30. The writing unit 26 reads the data failed to retransmit form the memory 25 and writes the read data to the disk device 30 (operation S416).

After the data failed to retransmit is written to the disk device 30 completely, the control unit 22 shuts down the CM 2 (operation S417).

The control unit 12 of the CM 1 determines whether the data retransmission has been performed successfully or not (operation S418). If not (No in operation S418), the control unit 12 waits until the CM 2 shuts down and detects the shutdown of the CM 2 after that (operation S419).

The control unit 12 instructs the reading unit 16 to read the data failed to retransmit from the disk device 30 and writes it to the memory 15. The reading unit 16 in response to the instruction reads the data failed to retransmit from the disk device 30 and stores the read data to the memory 15 (operation S420).

If the data retransmission has been performed successfully (Yes in operation S418) or the data failed to retransmit and written to the disk device 30 has completely been stored to the memory 15, the control unit 12 continues the normal processing (operation S421).

As described above, in the storage apparatus according to this embodiment, if a failure at a PCIe bridge of a source CM in duplexing prevents normal data transmission, data having a smaller size if any is transmitted through a transmission path having a lower transfer rate to the receiver side CM. This may increase the avoidance rate of the state that error data is kept in a memory of the CM that receives the data.

Having described mainly according to the aforementioned embodiments that data within a memory of the CM 2 is copied to a memory of the CM 1 for duplexing the data, the duplexing may be performed bidirectionally between the CM 1 and the CM 2. In this case, the CM 1 and CM 2 have mutually the same functions according to the embodiments, and the same processing according to the embodiments is performed even when data within a memory of the CM 1 is to be duplexed to the CM 2.

According to one aspect of the storage apparatus and storage apparatus control method disclosed in the subject application, the operations by the data receiver side CM may advantageously be continued even when a failure occurs which may influence the data receiver side CM. Moreover, the state that error data is kept in a memory may advantageously be avoided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
a first controller; and
a second controller;
wherein the first data controller includes a first storage unit that stores externally input data,
a first bus connecter that connects a transmission path for data of the first data controller and a transmission path for data of the second data controller,
a data transmitter that transmits the data stored in the first storage unit through the first bus connecter to the second data controller, and
a first failure detector that detects a failure in data transmission in the first bus connecter and causes the data transmitter to retransmit the data causing a failure during the transmission; and
wherein the second data controller includes a second storage unit that stores data transmitted from the first data controller,
a second bus connecter that connects a transmission path for data of the first data controller and a transmission path for data of the second data controller,
a data writing unit that acquires data transmitted by the data transmitter through the second bus connecting unit and writes it to the second storage unit,
a second failure detector that detects a failure in the second bus connecter and the data writing unit and determines whether the detected failure is caused by the first data controller or not, and
a control unit that, if the failure occurring in the second bus connecter and the data writing unit is caused by the first data controller, controls the second bus connecting unit and the data writing unit so as to receive and write the data retransmitted from the data transmitter.

2. The storage apparatus according to claim 1, further comprising a disk device; wherein
the first data controller includes
a writing unit that writes data into the disk device, and
a write controller that, if the first failure detector detects a failure also in retransmission of data by the data transmitter, controls the writing unit so as to write the data causing the failure in the transmission to the disk device,
the second data controller includes a reading unit that reads data stored in the disk device and stores it to the second storage unit; and
the control unit determines whether a failure caused by the first data controller has occurred in the second bus connecter and the data writing unit or not when data is retransmitted from the data transmitter and, if a failure has occurred, controls threading unit to read the data written by the writing unit and stored in the disk device and write it to the disk device.

3. The storage apparatus according to claim 1, wherein
the first data controller includes a low-speed transmitter that uses a low-speed transmission path having a lower transfer rate than a transmission path between the first bus connecter and the second bus connecter to transmit data to the second data controller,
the second data controller includes a low-speed receiver that receives data transmitted from the low-speed transmitter through the low-speed transmission path,
the first failure detector that, if the first failure detector detects a failure in data transmission of the first bus connecting unit,
determines whether the size of the data causing the failure in the transmission is equal to or lower than a predetermined value or not and, if it is equal to or lower than the predetermined value,
causes the low-speed transmitter to transmit the data and, if it is higher than the predetermined value, and causes the data transmitter to retransmit the data causing the failure during the transmission, and the control unit that, if data causing a failure during transmission is received by the low-speed receiver, stores the data to the second storage unit.

4. The storage apparatus according of claim 1, wherein the second data controller includes a transmitter that transmits externally input data stored in the second storage unit to the first data controller through the second bus connecting unit; and the control unit that, if a failure occurring in the second bus connecting unit and the data writing unit is caused by the first data controller, inhibits data transmission by the transmitter.

5. A control method for a storage apparatus including a first data controller and a second data controller, the control method comprising:

storing, by the first data controller, externally input data to a memory of the first data controller;

reading, by the first data controller, data stored in the memory of the first data controller and transmits the data to the second data controller through a PCIe bridge of the first data controller;

detecting, by the first data controller, a failure at the PCIe bridge of the first data controller in transmission of the data;

receiving, by the second data controller, the data transmitted from the first data controller through a PCIe bridge of the second data controller;

writing, by the second data controller, the received data to a memory of the second data controller;

determining, by the second data controller, whether the failure is caused by the first data controller or not if a failure occurs in the memory controller and PCIe bridge of the second data controller when the received data is written to the memory;

transmitting, by the first data controller, the data causing the failure during transmission through the PCIe bridge of the first data controller if a failure is detected in the first data controller and the second data controller and the failure is caused by the first data controller; and receiving, by the second data controller, the data retransmitted from the PCIe bridge of the first data controller through the PCIe bridge of the second data controller if a failure is detected in the first data controller and the second data controller and the failure is caused by the first data controller.

* * * * *